J. MENZIES.
SCREW SEATED VALVE.
APPLICATION FILED APR. 30, 1917.
1,244,881.
Patented Oct. 30, 1917.
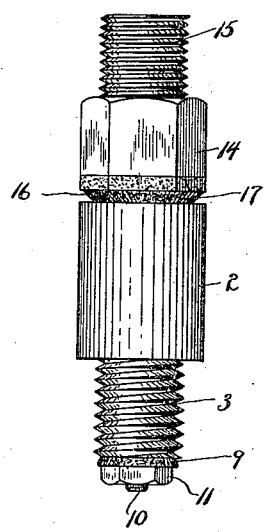
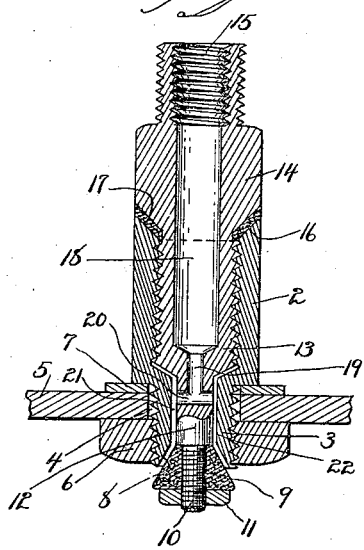
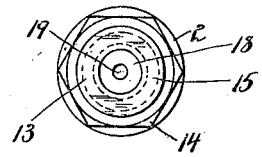
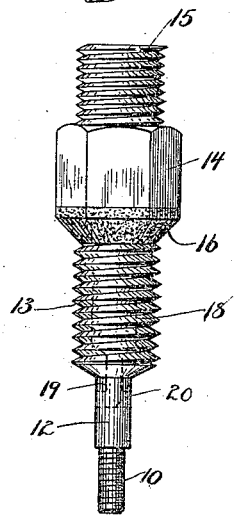

UNITED STATES PATENT OFFICE.

JOHN MENZIES, OF NEW HAVEN, CONNECTICUT.

SCREW-SEATED VALVE.

1,244,881.  Specification of Letters Patent.  Patented Oct. 30, 1917.

Application filed April 30, 1917.  Serial No. 165,371.

*To all whom it may concern:*

Be it known that I, JOHN MENZIES, a citizen of the United States, residing at New Haven, in the county of New Haven and State of Connecticut, have invented a new and useful Improvement in Screw-Seated Valves, and I do hereby declare the following, when taken in connection with the accompanying drawings and the characters of reference marked thereon, to be a full, clear, and exact description of the same, and which said drawings constitute part of this application, and represent, in—

Figure 1 a view in side elevation of a screw-seated valve constructed in accordance with my invention.

Fig. 2 a plan view thereof.

Fig. 3 a view thereof in central longitudinal section, shown as mounted for use.

Fig. 4 a detached view of the valve-plug, valve, and retaining-nut, shown as disassembled.

My invention relates to an improvement in screw-seated valves primarily designed for automobile tires, but capable of being used in a variety of other situations involving the use of air or gas under pressure, the object being to produce a simple, compact and convenient valve constructed with particular reference to preventing leakage of air or gas by the threads of the valve-plug when the valve is in its open position for charging.

With these ends in view, my invention consists in a screw-seated valve having certain details of construction and combinations of parts as will be hereinafter described and particularly recited in the claims.

In carrying out my invention as herein shown, I employ an internally threaded cylindrical valve-body 2 having its lower end formed with an externally threaded mounting-shank 3 which is passed through an opening 4 in the tire 5 and receives at its projecting end a retaining-nut 6 by means of which the said tire is pinched between the said nut and a washer 7 bearing against a shoulder on the body 2. I do not limit myself, however, to any way of mounting my improved valve, since that will vary with the circumstances of its use. The said shank 3 is formed within its end with a beveled valve-seat 8 co-acting with a conical valve 9 preferably made of some soft metal like spelter and screwed upon a threaded valve-stem 10 upon which it is locked by a lock-nut 11. The said stem 10 is formed integral with a smooth round shank 12 projecting from the inner end of an externally threaded valve-plug 13 screwed into the valve-body 2 and having its outer end formed with a nut-like or faceted operated portion 14 projecting above the body 2 and formed with an internally and externally threaded extension 15 for the attachment to it of male or female hose-connections. The underside of the nut 14 is beveled and provided with a spelter sealing-face 16 co-acting with a correspondingly beveled sealing-seat 17 formed at the outer end of the valve-body 2. The said plug 13 is formed with a longitudinal air-passage or bore 18 the contracted inner end 19 of which intersects a transverse air-passage 20 in the round shank 12, the ends of the said air-passage 20 opening into an annular air-passage 21 formed between the surface of the shank 12 and the walls of a bore 22 formed in the externally threaded shank 3 of the valve-body 2.

It will be seen by reference to Fig. 3 of the drawings, that by turning the threaded valve-plug 13 from right to left by its nut 14, the conical valve 9 will be positively seated against the valve-seat 8 in the shank 3 of the valve-body 2, and that the spelter sealing-face 16 will at the same time be moved away from the sealing-seat 17 as clearly shown in Fig. 1. When the conical valve 9 is thus seated upon the valve-seat 8, the valve is positively closed and any compressed air or gas is prevented from passing outward from an automobile tire or any other tank, through the valve. On the other hand, when for the purpose of blowing up the tire or charging the tank, the valve is opened by turning the plug 13 from left to right, the conical valve 9 will be moved away from the valve-seat 8 after which the spelter sealing-face 16 will be positively and solidly seated upon the sealing-seat 17, whereby the leakage of air between the external threads of the plug 13 and the internal threads of the body 2 will effectually be prevented. The action of the valve is thus seen to be positive in both phases of its adjustment.

I claim:—

1. In a screw-seated valve in which the valve proper is brought to a solid bearing upon its seat in a direction corresponding to the direction of the pressure, the combination with an internally threaded valve-body formed at its outer end with a sealing-seat and at its inner end with an air-passage terminating in a valve-seat; of an externally threaded valve-plug adapted to be inserted into the said valve-body through the outer end thereof and to extend at its inner end through the said air-passage, provided at its outer end with a sealing-face co-acting with the said sealing-seat and formed at its inner end with ducts intersecting the said air-passage, and a valve larger in diameter than the said air-passage applied to the inner end of the valve plug after the same has been located in the valve-body, whereby when the valve plug is turned in one direction the valve is brought to a solid bearing upon the said valve-seat, and the said sealing-face moved away from the said sealing-seat, and vice versa.

2. In a screw-seated valve in which the valve proper is brought to a solid bearing upon the valve-seat in a direction corresponding to the direction of the pressure, the combination with an internally threaded valve-body formed at its outer end with a sealing-seat, and at its inner end with an air-passage terminating in a valve-seat; of an externally threaded valve-plug adapted to be entered into the said valve-body from the outer end thereof, and provided at its outer end with a sealing-face co-acting with the said sealing-seat and formed at its inner end with a reduced shank provided with ducts intersecting the said air-passage and terminating in a threaded stem, and a valve larger in diameter than the said air-passage adapted to be applied to the said threaded stem for co-action with the said valve-seat after the valve-plug has been positioned within the valve-body, whereby when the plug is turned in one direction the valve is brought to a solid bearing upon the said valve-seat, and the said sealing-face moved away from the said sealing-seat, and vice versa.

In testimony whereof, I have signed this specification in the presence of two subscribing witnesses.

JOHN MENZIES.

Witnesses:
GEORGE D. SEYMOUR,
M. P. NICHOLS.

Copies of this patent may be obtained for five cents each, by addressing the "Commissioner of Patents. Washington, D. C."